(12) United States Patent
Kiefer, IV et al.

(10) Patent No.: US 12,420,718 B2
(45) Date of Patent: Sep. 23, 2025

(54) QUICK RELEASE AND LOCKING SYSTEMS FOR REMOVABLE CROSS-BARS FOR VEHICLES AND THE LIKE

(71) Applicant: N.B. Adventures LLC, Wyomissing, PA (US)

(72) Inventors: William H. Kiefer, IV, Elizabethtown, PA (US); Nathan T. Sutherland, Wyomissing, PA (US)

(73) Assignee: N.B. ADVENTURES LLC, Wyomissing, PA (US)

( * ) Notice: Subject to any disclaimer, the term of this patent is extended or adjusted under 35 U.S.C. 154(b) by 76 days.

(21) Appl. No.: 18/584,359

(22) Filed: Feb. 22, 2024

(65) Prior Publication Data

US 2025/0269802 A1    Aug. 28, 2025

(51) Int. Cl.
*B60R 9/052*    (2006.01)
*B60R 9/00*     (2006.01)
*B60R 9/058*    (2006.01)

(52) U.S. Cl.
CPC .............. *B60R 9/052* (2013.01); *B60R 9/058* (2013.01)

(58) Field of Classification Search
CPC ........... B60R 9/052; B60R 9/058; B60R 9/00; B60R 9/04; B60R 9/08; B60R 9/10; B60R 9/12
USPC .................................................... 248/222.13
See application file for complete search history.

(56) References Cited

U.S. PATENT DOCUMENTS

| | | | | |
|---|---|---|---|---|
| 3,064,868 A | * | 11/1962 | Treydte | B60R 9/058 224/330 |
| 3,638,844 A | * | 2/1972 | Bronson | B60R 9/12 224/323 |
| 3,920,167 A | * | 11/1975 | Parsons | B60R 9/058 224/330 |
| 4,809,943 A | * | 3/1989 | Taschero | B60R 9/058 224/329 |

(Continued)

OTHER PUBLICATIONS

"Jeep Roof Rack Crossbars for Wrangler JK (2-Pack) #2070450", Jeep Roof Cargo Brackets SKU #2070450 for $247.57 by ARIES Automotive, Installation Sheet, https://assets.curtmfg.com/masterlibrary/01ARIES/2070450/installsheet/2070450_INS.pdf (3 pages) for additional detail (Year: 2024).*

(Continued)

*Primary Examiner* — Nkeisha Smith
(74) *Attorney, Agent, or Firm* — WHDA, LLP

(57) ABSTRACT

According to some illustrative embodiments, a system for supporting a removable crossbar for mounting accessories on vehicles, includes: a support member having a lower section configured to attach to a vehicle and an upper section for support of accessories, and a removable crossbar including a quick release threadedly attached to an end thereof. The upper section of the support member includes a pocket configured for receiving the quick release of the removable crossbar. The removable crossbar is configured to be attached to the support member upon inserting the quick release in the pocket of the support member and engaging the quick release to clamp the end of the removable crossbar into the support member. And the crossbar is configured to be removable from the support member upon releasing the quick release to disengage the end of the crossbar from the support member.

16 Claims, 9 Drawing Sheets

(56) References Cited

U.S. PATENT DOCUMENTS

| | | | | |
|---|---|---|---|---|
| 4,877,169 | A * | 10/1989 | Grim | B60R 9/058 |
| | | | | 224/322 |
| 4,938,403 | A * | 7/1990 | Cortelli | B60R 9/00 |
| | | | | 224/403 |
| 5,197,642 | A * | 3/1993 | Cortelli | B60R 9/00 |
| | | | | 224/403 |
| 5,366,128 | A * | 11/1994 | Grim | B60R 9/058 |
| | | | | 224/330 |
| 5,472,256 | A * | 12/1995 | Tucker | B60J 7/102 |
| | | | | 296/100.18 |
| 5,931,359 | A * | 8/1999 | Zona | B60R 9/052 |
| | | | | 224/322 |
| 6,273,311 | B1 * | 8/2001 | Pedrini | B60R 9/045 |
| | | | | 224/331 |
| 6,497,350 | B1 * | 12/2002 | Hickey | B60R 9/058 |
| | | | | 224/329 |
| 10,808,741 | B2 * | 10/2020 | Ahnert | B25B 5/08 |
| 11,772,567 | B2 * | 10/2023 | Schroll | B60R 9/058 |
| | | | | 224/324 |
| 11,891,124 | B2 | 2/2024 | Kiefer, IV et al. | |
| 11,958,442 | B2 * | 4/2024 | Martinez | B60R 9/058 |
| 12,221,073 | B2 * | 2/2025 | Kiefer, IV | B60R 9/048 |
| 12,291,171 | B2 * | 5/2025 | Kiefer, IV | B60R 9/045 |
| 12,311,889 | B2 * | 5/2025 | Azzam | B60P 7/0815 |
| 2006/0273123 | A1 * | 12/2006 | Settelmayer | B60R 9/045 |
| | | | | 224/325 |
| 2020/0391665 | A1 * | 12/2020 | Schroll | F16B 2/12 |
| 2021/0362660 | A1 * | 11/2021 | Yang | B60R 9/052 |
| 2022/0324391 | A1 | 10/2022 | Kiefer, IV et al. | |
| 2022/0324392 | A1 | 10/2022 | Kiefer, IV et al. | |
| 2024/0034243 | A1 * | 2/2024 | Yao | B60R 9/08 |

OTHER PUBLICATIONS

"Jeep Roof Rack Crossbars for Wrangler JK (2-PACK) #2070450", Jeep Roof Cargo Brackets SKU #2070450 for $247.57 by ARIES Automotive. (2 pages).

"Accessories Parts Onstar All GMC", Gmc Removable Rail Kit by Thule®—Associated Accessories, 19419778, GMC Accessories. (5 pages).

"Overland Vehicle Systems Freedom Cross Bars System for Factory Side Rail Mount", Overland Vehicle Systems Freedom Cross Bars For Factory Side Rails. (5 pages).

"Rhino Adventure Gear", Rhino-Rack Vortex Cross Bars + Backbone Rack System Kit (Jeep Wrangler JL '18-'20 4DR Hardtop)—3 Base, Rhino-Rack Vortex Cross Bars + Backbone Kit (Jeep Wrangler JL Hardtop), (2024). (6 pages).

* cited by examiner

QUICK RELEASE AND LOCKING SYSTEMS FOR REMOVABLE CROSS-BARS FOR VEHICLES AND THE LIKE

BACKGROUND

The present invention relates to systems and methods for providing quick release of removable crossbars mounted to vehicles and locking systems for locking the bars in place. Preferred embodiments relate to quick release and locking systems for truck beds and the like.

Existing crossbar systems require tools for removal from a vehicle or truck bed and are time consuming to detach from a vehicle or truck bed.

SUMMARY

The preferred embodiments overcome shortcomings in the above and/or other background art.

In some preferred embodiments, a quick release system is provided to remove crossbars from a vehicle bed without the use of tools and in a quick manner. The quick release system also includes a locking system to lock the crossbars in place.

According to some preferred embodiments, a system for supporting a removable crossbar for mounting accessories on vehicles is provided that includes: a support member having a lower section configured to attach to a vehicle and an upper section for support of accessories, and a removable crossbar including a quick release threadedly attached to an end thereof. The upper section of the support member includes a pocket configured for receiving the quick release of the removable crossbar. The removable crossbar is configured to be attached to the support member upon inserting the quick release in the pocket of the support member and engaging the quick release to clamp the end of the removable crossbar into the support member. And the crossbar is configured to be removable from the support member upon releasing the quick release to disengage the end of the crossbar from the support member.

In some preferred embodiments, the quick release includes a cam release lever and a cam release bolt having a threaded portion for threadedly attaching to an end of the removable crossbar.

In some preferred embodiments, the quick release includes a rotatable handle and a bolt having a threaded portion for threadedly attaching to an end of the removable crossbar, and the rotatable handle is configured to engage and disengage the removable crossbar with the support member by rotating about an axis of the bolt.

In some preferred embodiments, the system includes a cam lock integrated with the upper section of the support member, and a locking slide slidably mounted to the removable crossbar. When the quick release is inserted in the pocket of the support member, the locking slide is configured to slide along the removable crossbar to engage with the cam lock such that the cam lock can be actuated to lock the removable crossbar to the support member. And when the cam lock is actuated to unlock the removable crossbar to the support member, the locking slide is configured to slide along the removable crossbar to disengage with the cam lock.

In some preferred embodiments, the system includes a brace attached to the upper section of the support member and the brace includes a lower support surface for supporting the removable crossbar. In some preferred embodiments, the brace further includes at least one upwardly extending lateral support surface.

In some preferred embodiments, the removable crossbar includes a plate attached to an end thereof, and the quick release is threadedly attached to the removable crossbar via the plate.

According to some preferred embodiments, a system for supporting a removable crossbar for mounting accessories on vehicles is provided that includes: a support member having a lower section configured to attach to a vehicle and an upper section for support of accessories, and a removable crossbar including a cam release lever attached to an end thereof with a cam release bolt. The upper section of the support member includes a slot configured for receiving the cam release bolt of the removable crossbar. The removable crossbar is configured to be attached to the support member upon inserting the cam release bolt in the slot of the support member and engaging the cam release lever to clamp the end of the removable crossbar into the support member. And the crossbar is configured to be removable from the support member upon releasing the cam release lever to disengage the end of the crossbar from the support member.

In some preferred embodiments, the system includes: a cam lock integrated with the upper section of the support member, and a locking slide slidably mounted to the removable crossbar. When the cam release bolt is inserted in the slot of the support member, the locking slide is configured to slide along the removable crossbar to engage with the cam lock such that the cam lock can be actuated to lock the removable crossbar to the support member. And when the cam lock is actuated to unlock the removable crossbar to the support member, the locking slide is configured to slide along the removable crossbar to disengage with the cam lock.

In some preferred embodiments, the removable crossbar includes a plate attached to an end thereof, and the cam release lever is attached to the removable crossbar by attachment of the cam release bolt to the plate.

According to some embodiments, a system for supporting a removable crossbar for mounting accessories on vehicles is provided that includes: a support member having a lower section configured to attach to a vehicle and an upper section for supporting a removable crossbar, a removable crossbar, a cam lock integrated with the upper section of the support member, and a locking slide slidably mounted to the removable crossbar. The locking slide is configured to slide along the removable crossbar to engage with the cam lock such that the cam lock can be actuated to lock the removable crossbar to the support member. And when the cam lock is actuated to unlock the removable crossbar to the support member, the locking slide is configured to slide along the removable crossbar to disengage with the cam lock.

In some preferred embodiments, the cam lock includes a locking tab, and the locking slide includes an opening for receiving the locking tab of the cam lock. The locking slide comprises an internal protrusion for engagement with the locking tab of the cam lock upon actuation of the cam lock to lock the crossbar to the support member.

In some preferred embodiments, the removable crossbar includes a channel along a length of the crossbar, and the locking slide includes a rail that fits in the channel for mounting the locking slide to the removable crossbar and allowing the locking slide to slide along the length of the removable crossbar.

According to some embodiments, a method for supporting a removable crossbar for mounting accessories on vehicles is provided that includes: mounting a plurality of support members on a vehicle, the plurality of support members each including a lower section for mounting to the vehicle and an upper section for supporting accessories, the upper section of each of the plurality of support members including a slot, providing a removable a crossbar having a plurality of ends thereof, each end including a cam release lever attached thereto with a cam release bolt, and attaching the removable crossbar to the plurality of support members by inserting the cam release bolt of each of the ends of the removable crossbar in a respective slot of the upper section of the plurality of support members and engaging each cam release lever to clamp each of the plurality of ends of the removable crossbar into the respective support member.

In some preferred embodiments, the method for supporting a removable crossbar for mounting accessories on vehicles includes: providing a cam lock integrated with the upper section of each of the plurality of support members, providing a plurality of locking slides slidably mounted to the removable crossbar, and locking the removable crossbar to the plurality of support members by sliding each of the plurality of locking slides along the removable crossbar and engaging with a respective cam lock of the upper section of each of the plurality of support members.

BRIEF DESCRIPTION OF THE DRAWINGS

The preferred embodiments of the present invention are shown by way of example, and not limitation, in the accompanying figures in which:

FIG. 3A provides an outside view of the system showing a cam release lever, a cam lock and a locking slide. FIG. 3B is an inside view showing the locking slide engaged with a support member and the cam lock.

DETAILED DESCRIPTION OF PREFERRED EMBODIMENTS OF THE INVENTION

Figure 1:
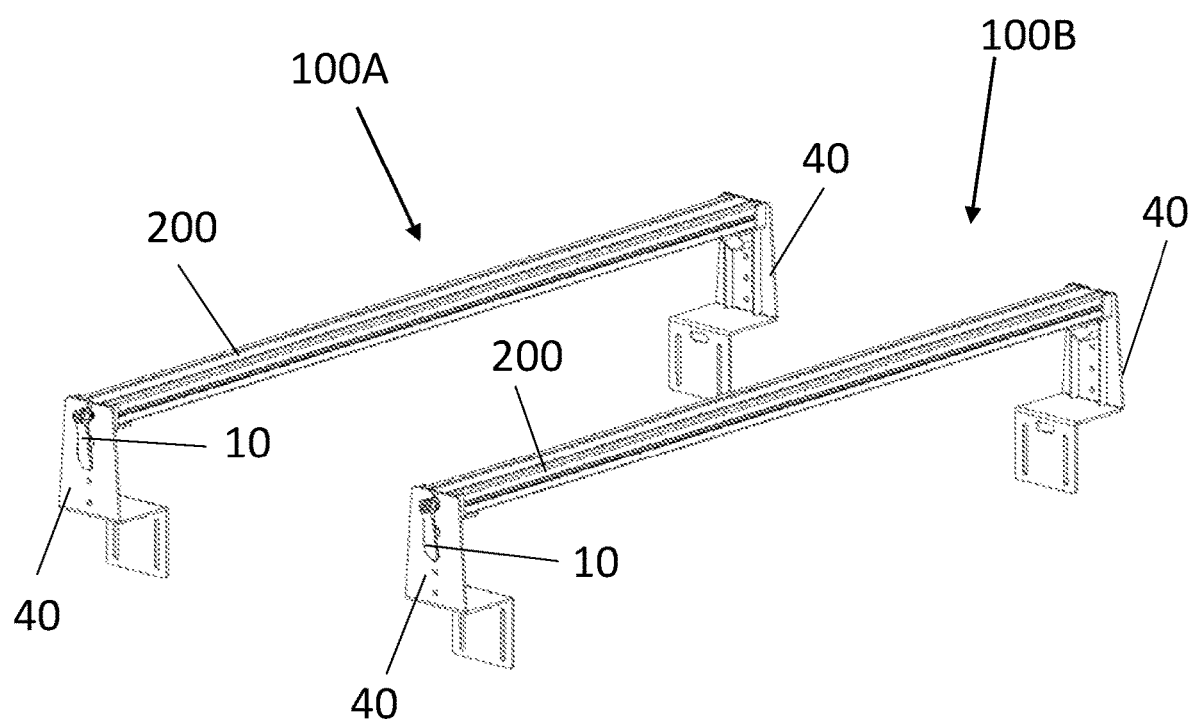
FIG. 1 is a perspective view showing a rack structure including the system for supporting a removable crossbar according to some illustrative embodiments of the invention.

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

Illustrative Sizes, Dimensions & Scale in Some Embodiments

Although sizes and dimensions of the preferred embodiments can be varied as desired in various embodiments and implementations of the present invention, in some embodiments, the attached figures show illustrative embodiments with the elements illustrated to scale in size and dimensions.

Illustrative Aspects of Preferred Embodiments

According to some preferred embodiments, quick release and locking systems for removable crossbars for truck beds and the like are provided for overcoming drawbacks of background devices. In the preferred embodiments, the quick release system is configured to provide quick removability of the crossbars without the use of tools, and the locking system is configured to lock the bars in place.

According to some preferred embodiments, the quick release system includes a plurality of support members for receiving, securing and supporting the removable crossbars with a quick release. In some preferred embodiments, the support members have a similar profile as the support members as set forth in the following patents and publications, the entire disclosures of which are incorporated herein by reference as though recited herein in full:

1. U.S. Pat. No. 11,891,124;
2. U.S. Patent Pub. No. 2022/0324391;
3. U.S. Patent Pub. No. 2022/0324392.

In some preferred embodiments, the quick release is a cam release lever having a cam release bolt in which the quick release is engaged and disengaged by pushing and pulling the cam release lever, respectively. In other preferred embodiments, the quick release is a rotatable handle having a bolt in which the quick release is engaged and disengaged by rotating the rotatable handle. In other preferred embodiments, the quick release is a screw or thumb screw having a bolt in which the quick release is engaged and disengaged by rotating the screw by hand. In other preferred embodiments, the quick release is a push-on retainer that engages by sliding over a bolt into a retained position to clamp the removable crossbar to the support and disengages by, for example, a release switch or lever.

In some preferred embodiments, the quick release is threadedly attached to an end of the removable crossbar. For example, in some preferred embodiments, the removable crossbar includes a tapping plate at an end thereof, and the tapping plate includes a hole having threads for receiving a threaded bolt of the quick release.

In some preferred embodiments, the support member includes a pocket for receiving the quick release of the removable crossbar. In some preferred embodiments, the pocket can be a slot for inserting a bolt of the quick release, and the removable crossbar is clamped to the support member by engaging a lever or rotatable handle. In other preferred embodiments, the pocket can be a hole for inserting a bolt of the quick release in which the removable crossbar is clamped to the support member with a push-on retainer.

In some preferred embodiments, a cam release lever connected to a cam release bolt attaches to a crossbar via a tapping plate attached to an end of the crossbar. The crossbar having the tapping plate and cam release lever attached thereto can quickly and easily attach to the support member by inserting the cam release bolt in a slot of the support member. Once the quick release bolt of the crossbar is inserted in the slot of the support member, the cross bar can be clamped and secured to the support member by engaging the quick release lever by, for example, pushing the lever. In some preferred embodiments, the support member includes crossbar support braces fixedly attached thereto. The crossbar support braces include a lower supporting surface upon which a crossbar can rest for supporting the crossbar once the cam release bolt is inserted in the slot of the support member. With the cam release bolt inserted in the slot of the support member and with the crossbar resting on the crossbar support brace, the cam release lever can be engaged to secure the crossbar to the support member.

In some preferred embodiments the tapping plate has a thickness of about ⅛ inch to about ½ inch, more preferably about ¼ inch to about ⅜ inch. The tapping plate is bolted or screwed to the crossbar. In some preferred embodiments, the crossbar is an extruded crossbar and can have an integrated T-slot.

In some preferred embodiments, the crossbar support brace also includes at least one upwardly extending lateral support surface for fixing the location of the crossbar 20 upon the brace. In preferred embodiments as illustrated in, e.g., FIGS. 4B and 5B, the crossbar support brace includes two upwardly extending lateral support surfaces such that the support brace forms substantially U-shaped members having an open top end which can readily receive an end of a crossbar 200.

In the preferred embodiments, the locking system includes a locking slide and a cam lock. In some preferred embodiments, the cam lock is integrated in the middle of the support member. The locking slide and cam lock engage to lock the cross bar to the support member. The locking slide can move to a position such that it is in contact with or close to the support member and so that a lock tab of the cam lock is inserted inside the locking slide. Once the lock tab of the cam lock is inside the locking slide by sliding the locking slide toward the support member, the cam lock can be turned into a position such that the locking tab engages with an internal protrusion or wall of the locking slide to secure the locking slide in place. In some preferred embodiments, rotation of the cam lock can be implemented with a key. With the locking slide engaged with the cam lock in a locked state, the crossbar cannot be removed from the support member even if the cam lever is released from the support member. Once the cam lock is unlocked by rotation into a position such that the locking tab is not engaged with the walls inside the locking slide, the locking slide can slide away from the support member and the cam lock to allow for removal of the crossbar by releasing the cam release lever. No tools are needed to remove the crossbars from the support members.

In some preferred embodiments, the locking slide is an injection molded piece and the locking slide can slide in an integrated T-slot of the crossbar. The locking slide can act as a shield to the backside of the cam lock.

FIG. 1 is a perspective view of a rack structure including the quick release and locking systems according to an embodiment of the invention. As seen in FIG. 1, each rack member 100A and 100B includes a crossbar 200 and two support members 40.

In some preferred embodiments as shown in FIG. 1, the rack structure includes a plurality of rack members 100A and 100B. Although some embodiments could implement a single rack member, and alternative embodiments could implement three rack members, or four rack members or even more rack members, in the preferred embodiments two rack members are employed.

Figure 2:
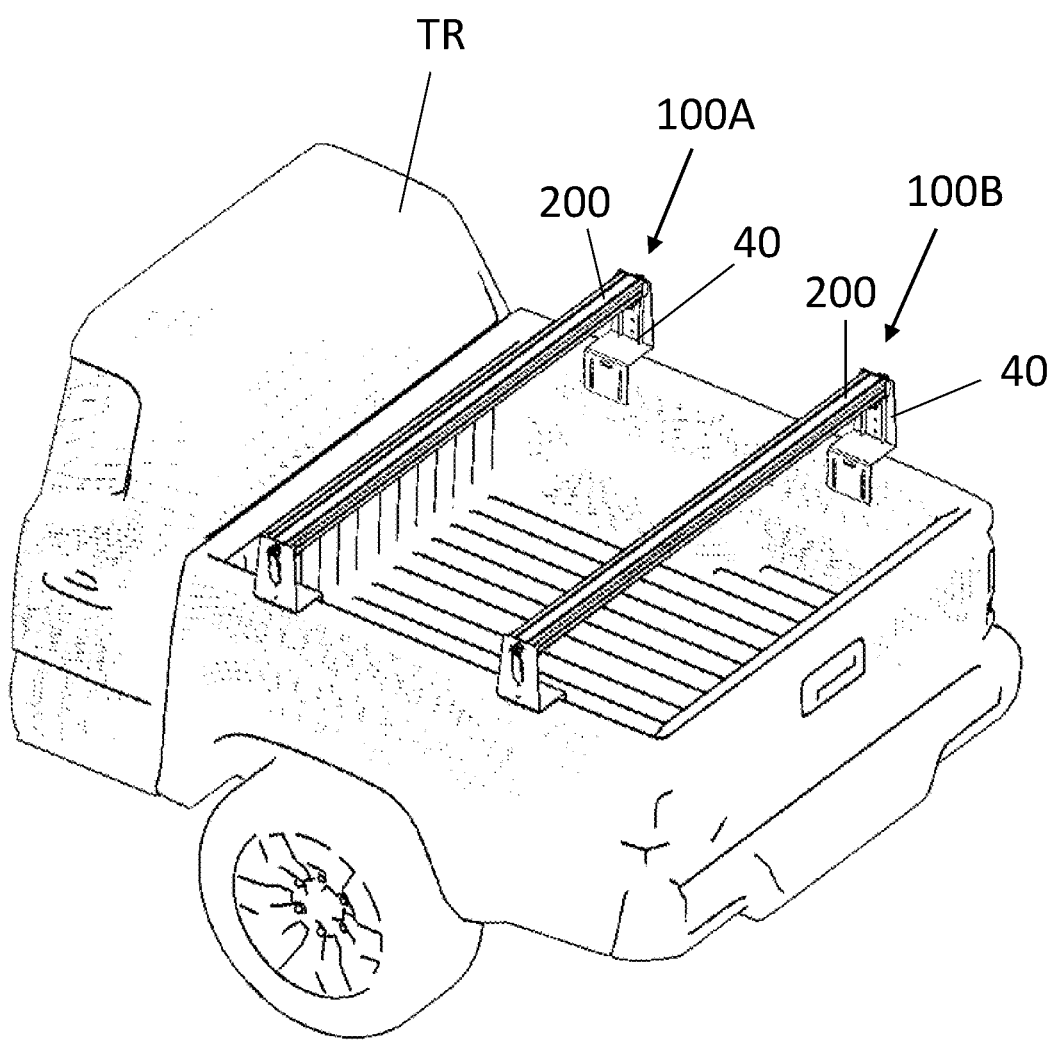
FIG. 2 is a side perspective view of the rack structure including the system for supporting a removable crossbar shown in FIG. 1 as mounted on a vehicle according to an illustrative implementation.

As shown in FIG. 1, each rack member 100A and 100B includes two support members 40 and a crossbar 200. In operation, the support members 40 are mounted to a vehicle and arranged to support the crossbar 200. For example, in some embodiments, rack members having the quick release and locking systems may be mounted to a truck TR as shown in FIG. 2.

Figure 3A:
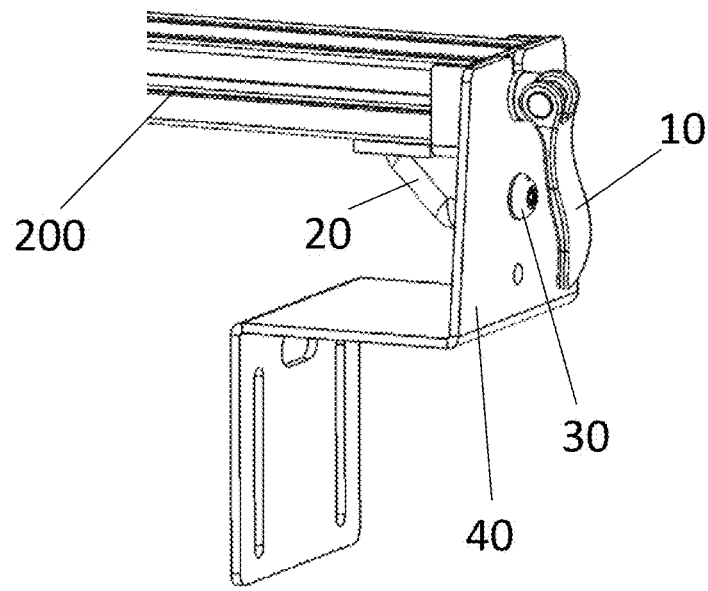
FIGS. 3A and 3B are different perspective views of the support and locking systems in a locked position according to some preferred embodiments.
Figure 3B:
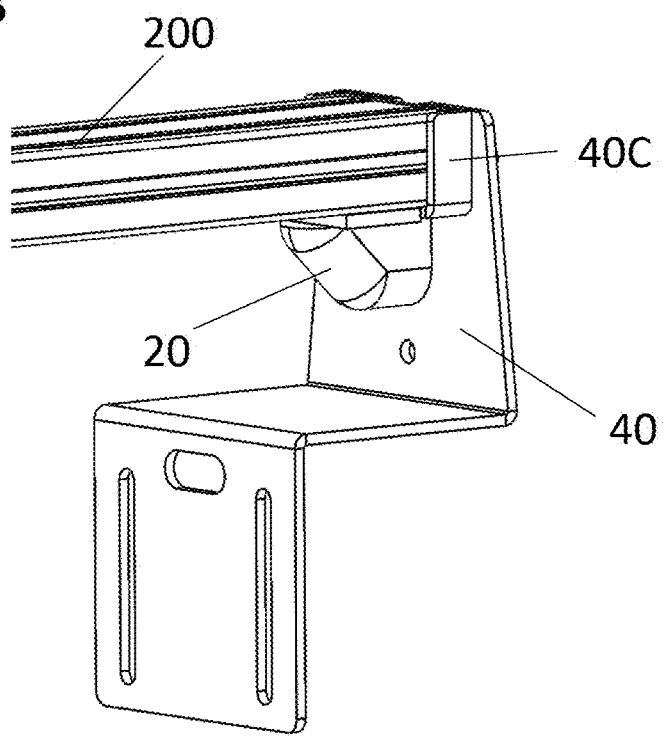

The quick release and locking systems include cam release levers 10 engaged with each of the support members 40. With the cam release levers 10 in an engaged state as shown in FIG. 1, the crossbars 200 are secured to the support members 40. FIG. 1 further shows locking slides 20 engaged with the support members 40. FIGS. 3A and 3B provide a detailed view of a cam release lever 10 and a locking slide 20 engaged with the support members 40. With the locking slides 20 engaged with the support members 40 and cam locks 30 in a locked state, the crossbars 200 cannot be removed from the support members 40 even if the cam release levers 10 are in a released stated.

Figure 5A:
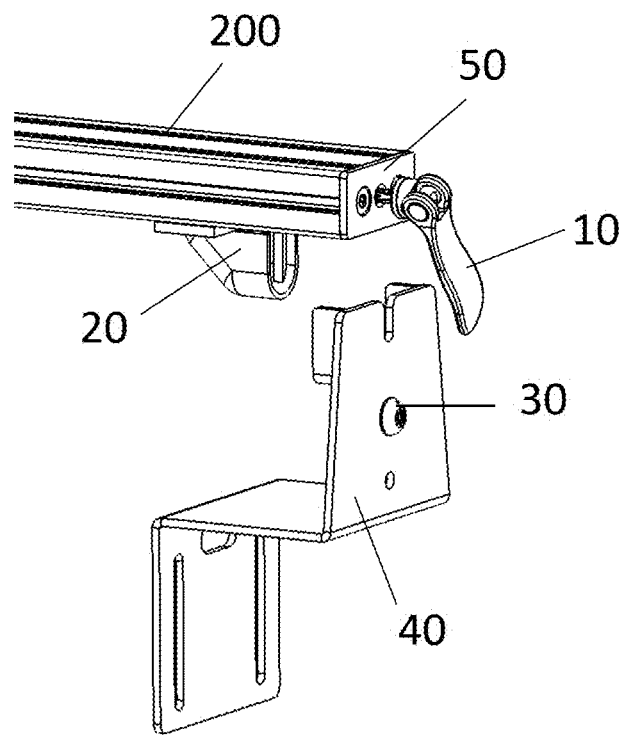
FIGS. 5A and 5B are different perspective views of the support and locking systems with the crossbar removed from the support member according to some preferred embodiments.
Figure 5B:
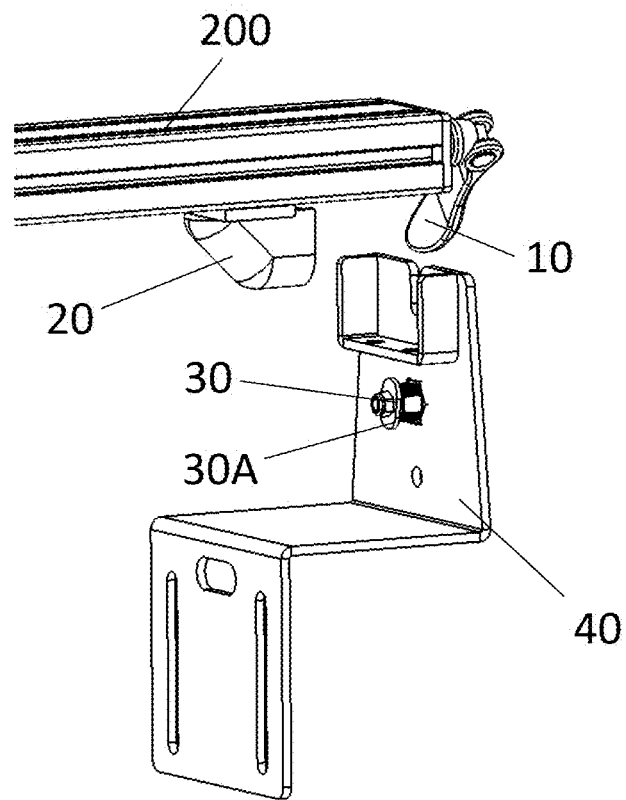

Once the cam locks 30 are unlocked, the locking slides 20 can slide away from the cam locks 30 and the support members 40. With the locking slides 20 in a position away from the cam locks 30, the crossbars 200 can be removed from the support members 40 if the cam release levers 10 are released. FIGS. 5A and 5B show the crossbar 20 removed from the support member 40.

Figure 4A:
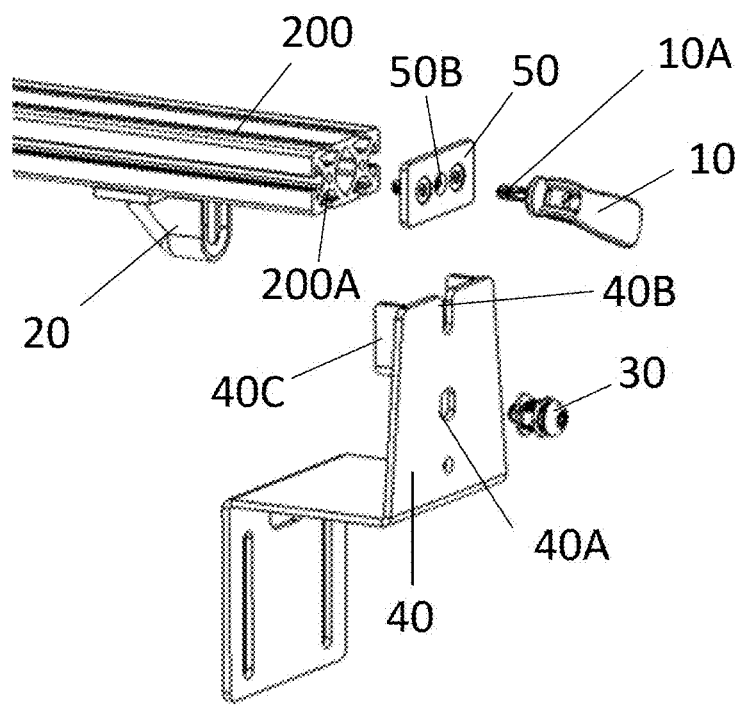
FIGS. 4A and 4B are different perspective views of the support and locking systems showing individual components according to some preferred embodiments.
Figure 4B:
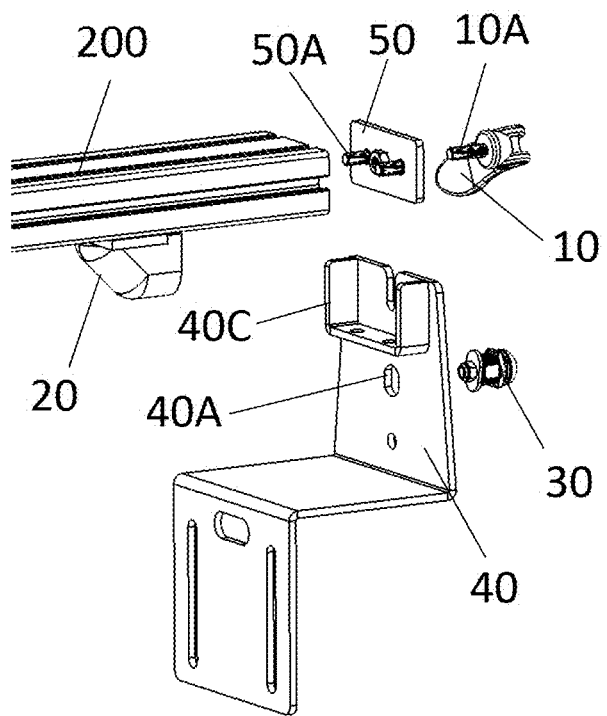

In some preferred embodiments, the support member 40 includes a slot 40B at the top of the support member 40 for receiving the cam release bolt 10A of cam release lever 10 as shown in FIGS. 4A and 4B. FIG. 5A shows the cam release lever 10 installed on the crossbar 200 via tapping plate 50 and ready for insertion of the cam release bolt 10A of cam release lever 10 in slot 40B of the support member 40.

In some preferred embodiments, the support member 40 has a through-hole 40A at a position below the slot 40B for receiving a cam lock 30. The cam lock 30 can be installed on or integrated with support member 40 via through-hole 40A as seen in FIGS. 5A and 5B.

In some preferred embodiments, support member 40 includes a crossbar support brace 40C fixedly attached thereto. In the preferred embodiments, the crossbar support braces 40C include a lower supporting surface upon which a crossbar 200 can rest. In the preferred embodiments, the crossbar support braces 40C also include at least one upwardly extending lateral support surface for fixing the location of the crossbar 200 upon the brace 40C. In the illustrated embodiment as seen in, e.g., FIG. 5B, the support braces 40C include two upwardly extending lateral support surfaces, such that the support braces 40C form substantially U-shaped members having an open top end which can readily receive an end of a crossbar 200. In some preferred embodiments, the crossbar support braces can be similar to that of any of the support braces as set forth in U.S. Patent Pub. No. 2022/0324391 which is incorporated herein by reference as though recited herein in full.

In some preferred embodiments, the crossbars 200 are extruded members. In some preferred embodiments, the crossbars are made with extruded aluminum. In some embodiments, the crossbars can be formed with a substantially rectangular or square cross-sectional configuration. In some embodiments, such as, e.g., shown, the crossbars include ridges or channels 200A extending along the lengths of one or more of the walls of the crossbars. In the preferred embodiments, the ridges or channels are configured to facilitate mounting of the locking slide 20 in a slidable manner. In the preferred embodiments, the ridges or channels are configured to facilitate mounting of accessories to the crossbars. Moreover, the ridges or channels 200A can also serve to increase strength of the crossbars and resist breakage and/or bending. In some preferred embodiments, the crossbars can be similar to that of any of the crossbars as set forth in U.S. Patent Pub. No. 2022/0324391 which is incorporated herein by reference as though recited herein in full.

In some preferred embodiments, tapping plates 50 can be attached to ends of the crossbars 200 via bolts or screws 50A. The tapping plates 50 further include a threaded receiving hole 50B for receiving the cam release bolt 10A of the cam release lever 10. FIGS. 4A and 4B show the tapping plate 50 prior to attachment to the crossbar 200. FIGS. 5A and 5B show the tapping plate 50 attached to the crossbar 200 via screws. FIGS. 5A and 5B also show cam release bolt 10A of the cam release lever 10 inserted into the threaded receiving hole 50B of the tapping plate 50.

Figure 8A:
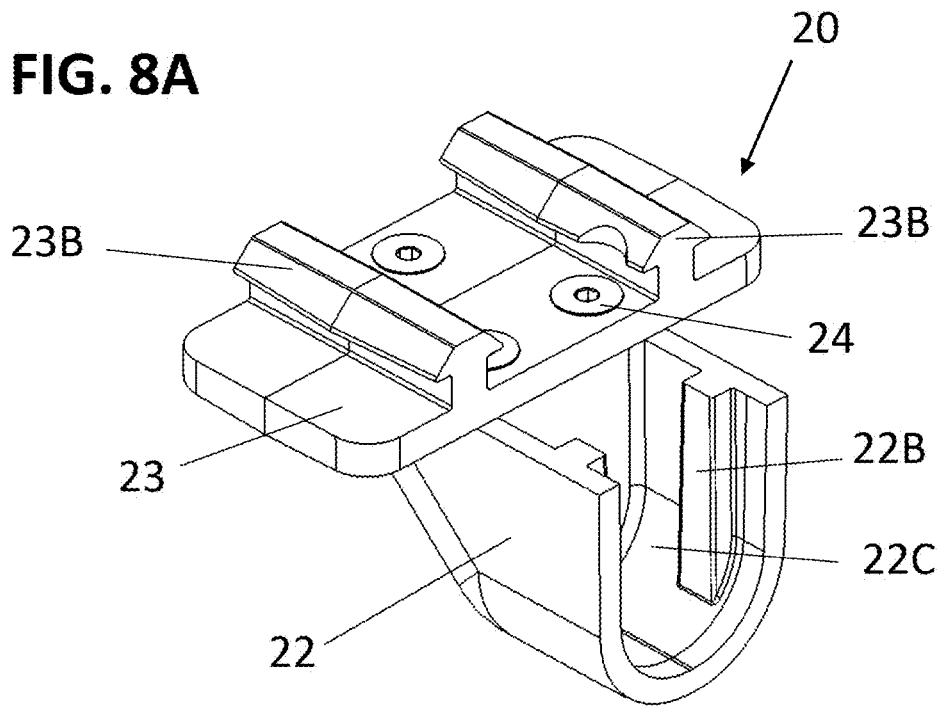
FIG. 8A is a perspective view of the locking slide and FIG. 8B is a perspective of the individual components of the locking slide.
Figure 8B:
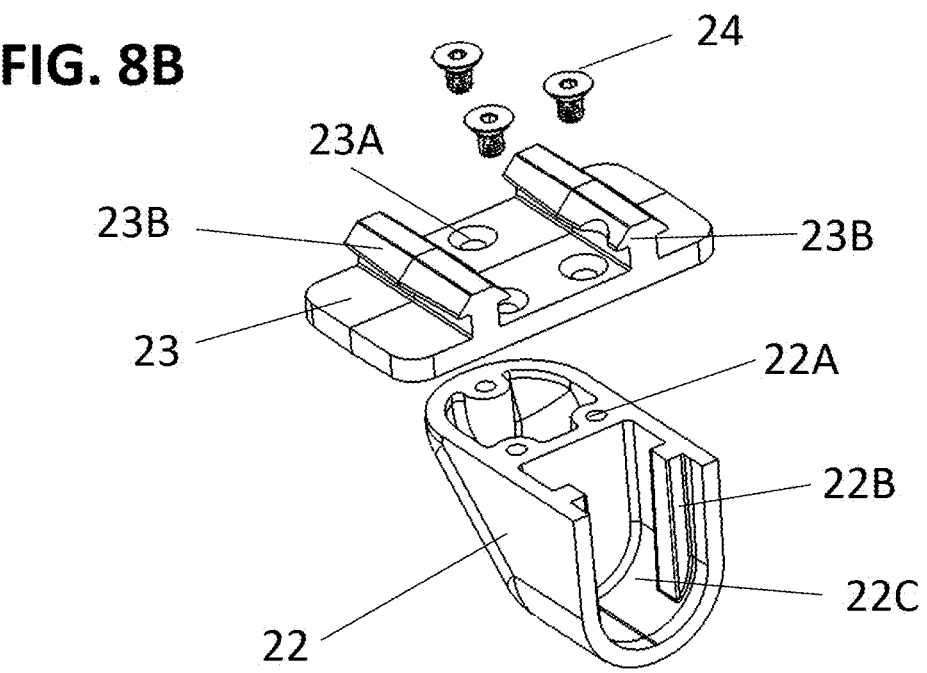

In some preferred embodiments, locking slide 20 includes a housing 22 and a sliding plate 23 as shown in FIG. 8A. Housing 22 includes threaded receiving holes 22A and sliding plate 23 includes through holes 23A as seen in FIG. 8B. As seen in FIGS. 8A and 8B, sliding plate 23 can attach to the housing with bolts or screws 24 inserted in through holes 23A of the sliding plate and into the threaded receiving holes 22A of housing 22. The sliding plate 23 also includes sliders or rails 23B having a profile such that sliders 23B fit in and slide in channels 200A of the crossbar 200. In some preferred embodiments, the sliders 23B have a profile that matches the profile of channels 200A. In some preferred embodiments, as illustrated, the sliders 23B can have a T-shaped profile and channels 200A can be a T-shaped channel forming a T-slot. Sliders 23B allow for the locking slide 20 to slide along the crossbar 200 while remaining attached to the crossbar 200.

In preferred embodiments, locking slide 20 includes an opening 22C in housing 22 for receiving the cam lock 30. With the cam lock 30 in the unlocked state, locking slide 20 can slide toward the support member 40 and to a position such that the cam lock 30 is received in the opening 22C in the housing 22 of the locking slide 20. In some preferred embodiments, when the locking slide is engaged with the cam lock 30 with the cam lock 30 inserted in the opening 22C, the locking slide surrounds the cam lock 30 and acts as a protective shield to the cam lock 30 as illustrated in, e.g., FIG. 3B.

As shown in FIGS. 8A and 8B, in some preferred embodiments, the housing 22 of locking slide 20 includes an internal protrusion or wall 22B for interacting and engaging with cam lock 30 to lock the cam lock 30 and secure the locking slide in place. In some preferred embodiments, the housing 22 of locking slide 20 includes one more internal protrusions or walls 22B. In some preferred embodiments as illustrated, the housing 22 includes two internal protrusions or walls 22B.

In some preferred embodiments as shown in, e.g., FIG. 5B, cam lock 30 includes one or more lock tabs 30A. In the unlocked state, the lock tab 30A fits in opening 22C in a position past the internal protrusions or walls 22B of the locking slide 20. Cam lock 30 can be rotated to engage the lock tab 30A with the internal protrusions or walls 22B of the locking slide 20 to lock the locking slide 20 in place. With the locking slide 20 locked in place by the cam lock 30, the crossbars 200 cannot be removed from the support member 40 even if the cam release lever 10 is released, because the crossbar 200 is attached to the locking slide 20 by the sliders 23B. When the locking slide 20 is engaged with the cam lock 30 such that the cam lock 30 is inserted in opening 22C of the housing 22, due to the housing 22 of the locking slide 20 and the cam lock 30, the locking slide 20 prevents the crossbar 200 from moving in upward and lateral directions.

Figure 6A:
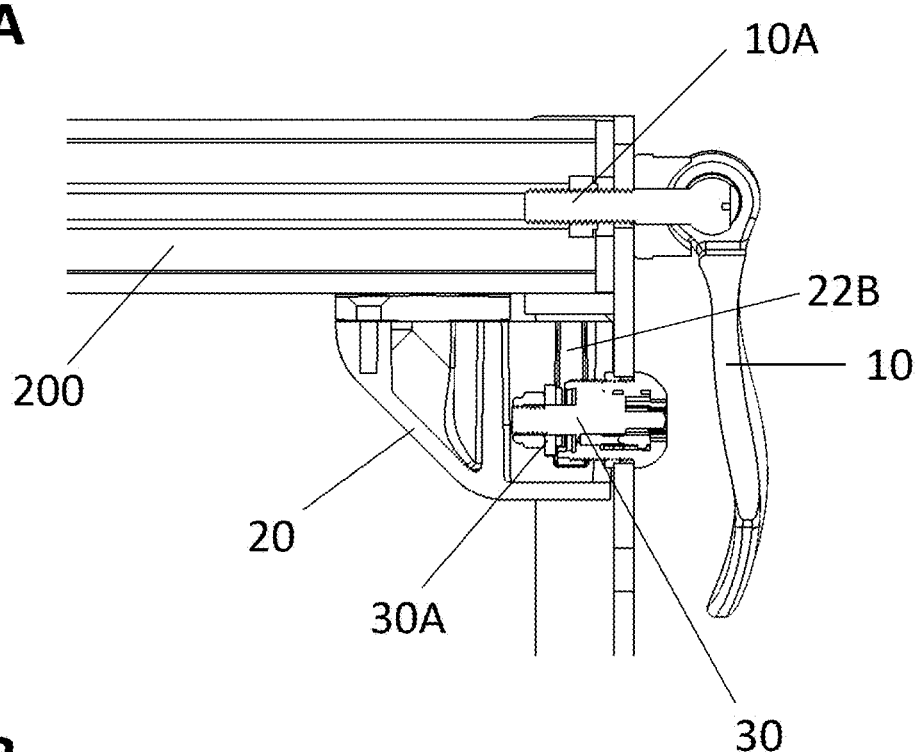
FIG. 6A is a side cross-section view and FIG. 6B is a perspective cross-section view of the support and locking systems with the locking system in the locked state according to some preferred embodiments.
Figure 6B:
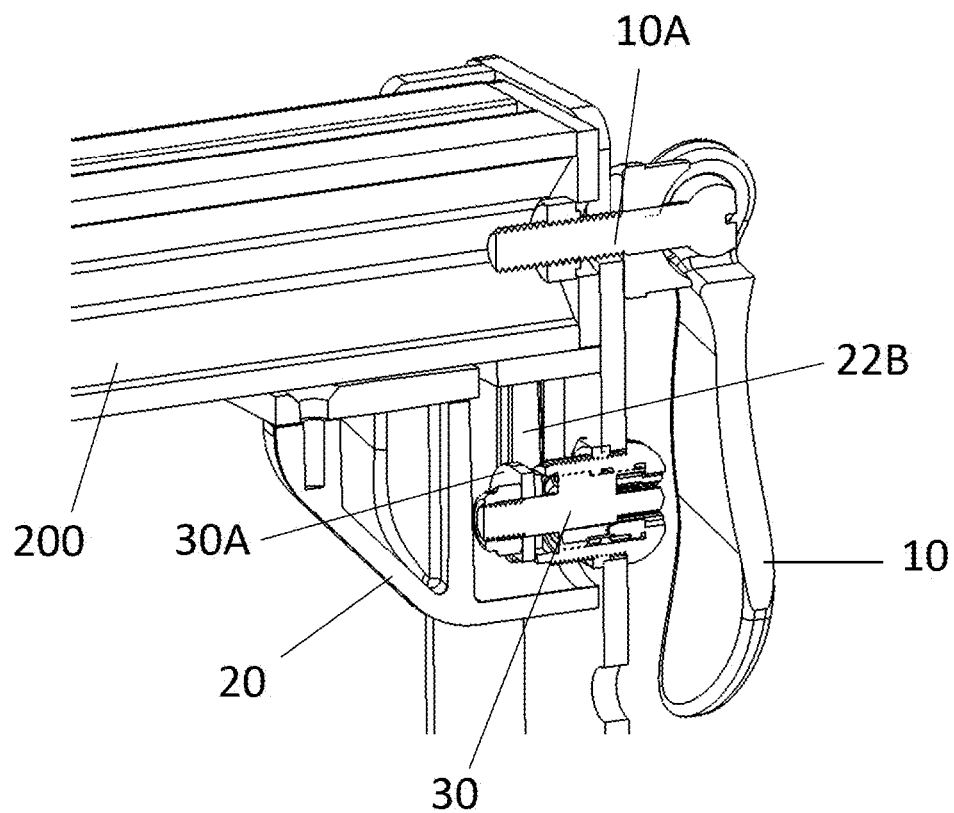

FIGS. 6A-7B provide cross sections views of the quick release and locking systems according to some preferred embodiments. In FIGS. 6A and 6B, the system is in the locked state. The cam release lever 10 attached to the crossbar 200 is engaged with the support member 40 such that the crossbar is attached to the support member 40. The locking slide is in a position toward the support member 40 with the cam lock 30 inserted in opening 22C of housing 22 of the locking slide 20. The cam lock 30 is rotated in a position such that lock tab 30A is engaged with the internal protrusions or walls 22B of housing 22 of locking slide 20. Thus, the crossbar 200 cannot be removed from the support member 40. Even if the cam release lever in FIGS. 6A and 6B is released, the locking slide 20 engaged with the cam lock 30 prevents the crossbar 200 from being removed from the support member 40.

Figure 7A:
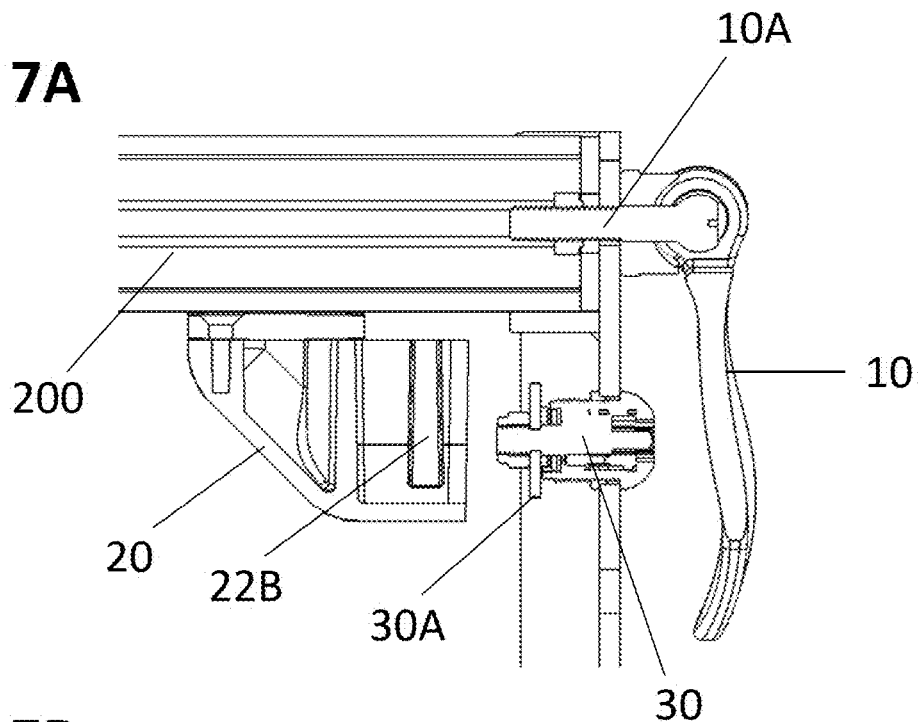
FIG. 7A is a side cross-section view and FIG. 7B is a perspective cross-section view of the support and locking systems with the locking system in the unlocked state according to some preferred embodiments.
Figure 7B:
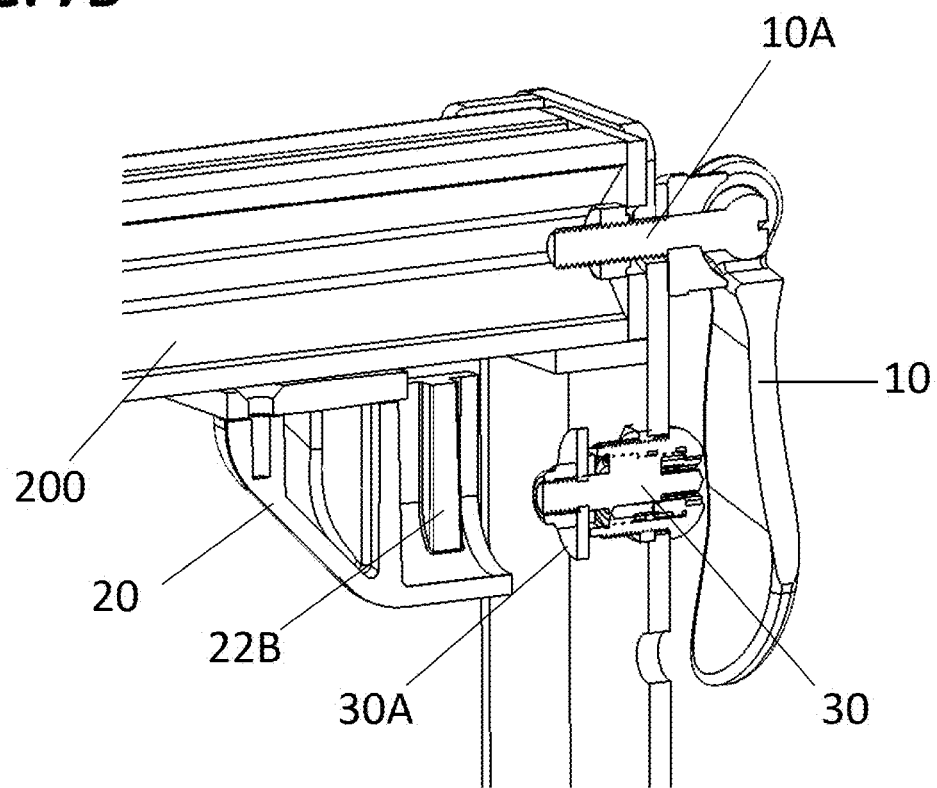

In FIGS. 7A and 7B, the system is in an unlocked state. The cam lock has been rotated 90 degrees such that lock tab 30A is no longer engaged with the internal protrusions or walls 22B of housing 22 of the locking slide 20 and the locking slide is in a position away from the support member 40 such that the cam lock 30 is no longer inserted in the opening 22C of the housing 22 of the locking slide 20. In this state, once the cam release lever 10 is released, the crossbar 200 can be removed from the support member 40.

Figure 9A:
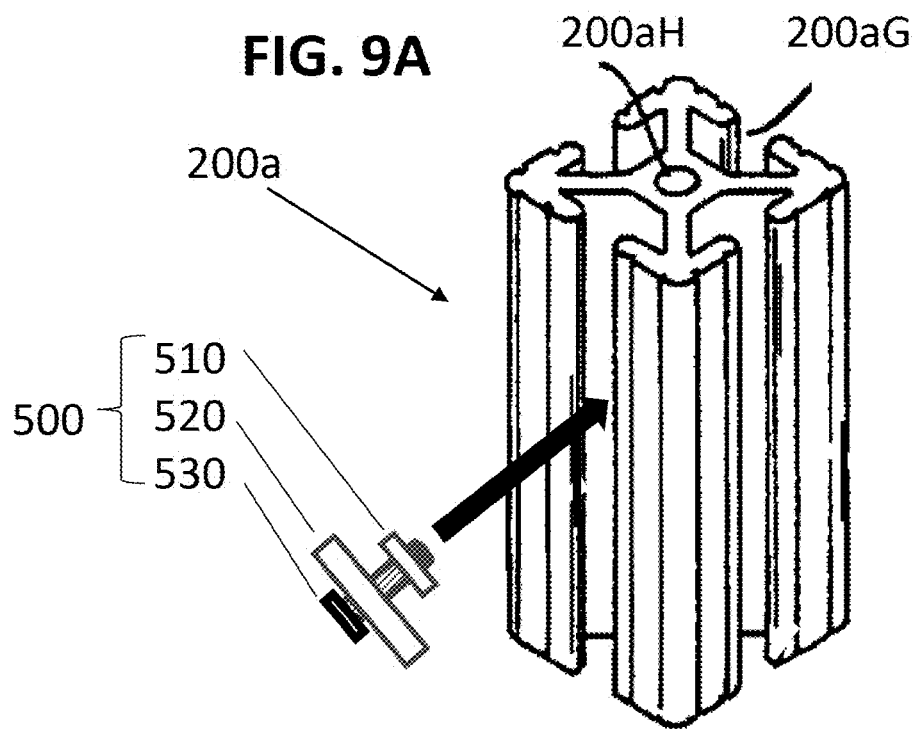
FIG. 9A is a perspective view of an illustrative type of cross-bar structure according to some illustrative embodiments.
Figure 9B:
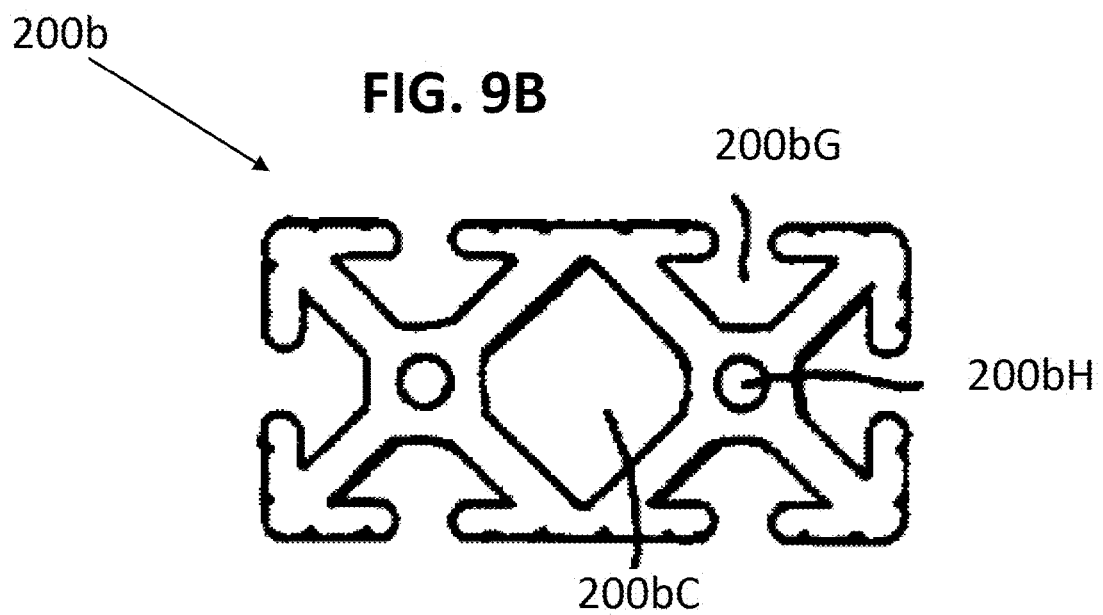
FIG. 9B is an end view of another illustrative type of cross-bar structure according to some other illustrative embodiments.

For reference, in some embodiments, a crossbar can be configured similar to that shown in FIGS. 9A and 9B (i.e., which is similar to crossbars shown in U.S. Pat. Nos. 5,429,438 and 11,891,124, the entire disclosures of which are incorporated herein by reference as though recited herein in full). For example, FIG. 9A shows a cross bar 200a, having four T-slot channels 200aG. As schematically shown in FIG. 9A, such T-slot channels can readily support a variety of accessories that can be mounted thereto by mounting hardware configured to be mounted to such T-slots. For example, FIG. 9A shows an illustrative mounting hardware 500, which includes a threaded nut member 510 configured to fit within the slot of the T-slot, a plate member 520 having a through-hole and configured to be placed alongside the cross-bar 200a adjacent the T-slot having the threaded nut member 510, and a bolt 530 configured to pass through the plate member 520 and be threadedly engaged with the threaded nut member 510. In some embodiments, the nut member 510 can be initially inserted into the T-slot via the axial open end shown at the top of FIG. 9A, while in some embodiments, the nut member 510 can be laterally slit through the narrower elongated slot at a position between the ends of the crossbar and then turned to align with the bolt 530 for threading connection. Although FIG. 9A shows a plate member 520, in various embodiments, the member 520 can be configured in a variety of manners and/or can be attached to further elements to support a variety of items and/or accessories.

As also shown in FIG. 9A, in the preferred embodiments, the crossbar 200a includes a central hole 200aH, via which a supporting bolt or the like can be threadingly connected in some preferred embodiments.

With reference to FIG. 9B, this figure shows another embodiment that is more analogous to the embodiments shown in FIGS. 1-9, which includes six T-slots 200bG around the periphery of the crossbar 200b. In the embodiment shown in FIG. 9B, the central region 200bC is preferably open, and two central holes 200bH are included via which the bolts or screws 50A of the tapping plate 50 can be threadedly connected for attaching the tapping plate 50 to the ends of the crossbar 200 in some preferred embodiments. The embodiment shown in FIG. 9B can be adapted to connect accessories similarly to that of the embodiment of FIG. 9A, as well as to that of the various patents and publications incorporated herein.

Broad Scope of the Invention

While illustrative embodiments of the invention have been described herein, the present invention is not limited to the various preferred embodiments described herein, but includes any-and-all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example." The use of individual numerical values is stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. Additionally, the disclosure of ranges is intended as a continuous range including every value between the minimum and maximum values plus the broadening of the range afforded by the use of the term "about", "substantially", or "approximately." Thus, recitation of ranges of values herein are merely intended to serve as a shorthand method of referring individually to each separate value falling within the range, unless otherwise indicated herein, and each separate value is incorporated into the specification as if it were individually recited herein. It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A system for supporting a removable crossbar for mounting accessories on vehicles, comprising:
a support member having a lower section configured to attach to a vehicle and an upper section for support of accessories,
a removable crossbar including a quick release threadedly attached to an end thereof,
a cam lock integrated with the upper section of the support member, and
a locking slide slidably mounted to the removable crossbar,
wherein the upper section of the support member includes a pocket configured for receiving the quick release of the removable crossbar,
the removable crossbar is configured to be attached to the support member upon inserting the quick release in the pocket of the support member and engaging the quick release to clamp the end of the removable crossbar into the support member,
the crossbar is configured to be removable from the support member upon releasing the quick release to disengage the end of the crossbar from the support member,
wherein when the quick release is inserted in the pocket of the support member, the locking slide is configured to slide along the removable crossbar to engage with the cam lock such that the cam lock can be actuated to lock the removable crossbar to the support member, and
wherein when the cam lock is actuated to unlock the removable crossbar to the support member, the locking slide is configured to slide along the removable crossbar to disengage with the cam lock.

2. The system for supporting a removable crossbar of claim 1, wherein the quick release includes a cam release lever and a cam release bolt having a threaded portion for threadedly attaching to the end of the removable crossbar.

3. The system for supporting a removable crossbar of claim 1, wherein the quick release includes a rotatable handle attached to a bolt having a threaded portion for threadedly attaching to the end of the removable crossbar, and the rotatable handle is configured to engage and disengage the removable crossbar with the support member by rotating about an axis of the bolt.

4. The system for supporting a removable crossbar of claim 1, further comprising a brace attached to the upper section of the support member,
wherein the brace comprises a lower support surface for supporting the removable crossbar.

5. The system for supporting a removable crossbar of claim 4, wherein the brace further comprises at least one upwardly extending lateral support surface.

6. The system for supporting a removable crossbar of claim 1, wherein
the removable crossbar includes a plate attached to the end thereof, and
the quick release is threadedly attached to the removable crossbar via the plate.

7. A system for supporting a removable crossbar for mounting accessories on vehicles, comprising:
a support member having a lower section configured to attach to a vehicle and an upper section for support of accessories,
a removable crossbar including a cam release lever attached to an end thereof with a cam release bolt,
a cam lock integrated with the upper section of the support member, and
a locking slide slidably mounted to the removable crossbar,
wherein the upper section of the support member includes a slot configured for receiving the cam release bolt of the removable crossbar,
the removable crossbar is configured to be attached to the support member upon inserting the cam release bolt in the slot of the support member and engaging the cam release lever to clamp the end of the removable crossbar into the support member,
the crossbar is configured to be removable from the support member upon releasing the cam release lever to disengage the end of the crossbar from the support member,
wherein when the cam release bolt is inserted in the slot of the support member, the locking slide is configured to slide along the removable crossbar to engage with the cam lock such that the cam lock can be actuated to lock the removable crossbar to the support member, and
wherein when the cam lock is actuated to unlock the removable crossbar to the support member, the locking slide is configured to slide along the removable crossbar to disengage with the cam lock.

8. The system for supporting a removable crossbar of claim 7, further comprising a brace attached to the upper section of the support member,
wherein the brace comprises a lower support surface for supporting the removable crossbar.

9. The system for supporting a removable crossbar of claim 8, wherein the brace further comprises at least one upwardly extending lateral support surface.

10. The system for supporting a removable crossbar of claim 7, wherein
the cam lock comprises a locking tab,
the locking slide comprises an opening for receiving the locking tab of the cam lock, and
the locking slide comprises an internal protrusion for engagement with the locking tab of the cam lock upon actuation of the cam lock to lock the crossbar to the support member.

11. The system for supporting a removable crossbar of claim 7, wherein
the removable crossbar comprises a channel along a length of the crossbar, and
the locking slide comprises a rail that fits in the channel for mounting the locking slide to the removable crossbar and allowing the locking slide to slide along the length of the removable crossbar.

12. The system for supporting a removable crossbar of claim 7, wherein
the removable crossbar includes a plate attached to the end thereof, and
the cam release lever is attached to the removable crossbar by attachment of the cam release bolt to the plate.

13. A system for supporting a removable crossbar for mounting accessories on vehicles, comprising:
a support member having a lower section configured to attach to a vehicle and an upper section for supporting a removable crossbar,
a removable crossbar,
a cam lock integrated with the upper section of the support member, and
a locking slide slidably mounted to the removable crossbar,
wherein the locking slide is configured to slide along the removable crossbar to engage with the cam lock such that the cam lock can be actuated to lock the removable crossbar to the support member, and
when the cam lock is actuated to unlock the removable crossbar to the support member, the locking slide is configured to slide along the removable crossbar to disengage with the cam lock.

14. The system for supporting a removable crossbar of claim 13, wherein
the cam lock comprises a locking tab,
the locking slide comprises an opening for receiving the locking tab of the cam lock, and
the locking slide comprises an internal protrusion for engagement with the locking tab of the cam lock upon actuation of the cam lock to lock the crossbar to the support member.

15. The system for supporting a removable crossbar of claim 13, wherein
the removable crossbar comprises a channel along a length of the removable crossbar, and
the locking slide comprises a rail that fits in the channel for mounting the locking slide to the removable crossbar and allowing the locking slide to slide along the length of the removable crossbar.

16. A method for supporting a removable crossbar for mounting accessories on vehicles, comprising:
mounting a plurality of support members on a vehicle, the plurality of support members each including a lower section for mounting to the vehicle and an upper section for supporting accessories, the upper section of each of the plurality of support members including a slot,
providing a removable a crossbar having a plurality of ends thereof, each end including a cam release lever attached thereto with a cam release bolt,
attaching the removable crossbar to the plurality of support members by inserting the cam release bolt of each of the ends of the removable crossbar in a respective slot of the upper section of the plurality of support members and engaging each cam release lever to clamp each of the plurality of ends of the removable crossbar into a respective support member, providing a cam lock integrated with the upper section of each of the plurality of support members, providing a plurality of locking slides slidably mounted to the removable crossbar, and locking the removable crossbar to the plurality of support members by sliding each of the plurality of locking slides along the removable crossbar and engaging with a respective cam lock of the upper section of each of the plurality of support members.

\* \* \* \* \*